United States Patent
Park

(10) Patent No.: US 8,493,350 B2
(45) Date of Patent: Jul. 23, 2013

(54) TOUCH PANEL USING A LIGHT SENSING METHOD, METHOD FOR DETECTING A TOUCH LOCATION, AND RECORDING MEDIUM STORING PROGRAM TO EXECUTE THE METHOD

(75) Inventor: Sung-Un Park, Yongin (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 546 days.

(21) Appl. No.: 12/801,108

(22) Filed: May 24, 2010

(65) Prior Publication Data

US 2011/0050603 A1    Mar. 3, 2011

(30) Foreign Application Priority Data

Aug. 26, 2009   (KR) .................. 10-2009-0079186

(51) Int. Cl.
*G06F 3/041* (2006.01)

(52) U.S. Cl.
USPC .......................................................... 345/173

(58) Field of Classification Search
USPC ............. 345/156, 173–178; 178/19.01–19.04
See application file for complete search history.

(56) References Cited

U.S. PATENT DOCUMENTS

| | | | |
|---|---|---|---|
| 4,700,231 A * | 10/1987 | Matsumoto | 348/245 |
| 7,173,607 B2 * | 2/2007 | Matsumoto et al. | 345/173 |
| 2005/0259097 A1 | 11/2005 | Lehoty et al. | |
| 2008/0084377 A1 | 4/2008 | Tateuchi et al. | |
| 2009/0050376 A1 * | 2/2009 | Jeon et al. | 178/18.03 |
| 2010/0053112 A1 * | 3/2010 | Chen | 345/174 |

FOREIGN PATENT DOCUMENTS

| | | |
|---|---|---|
| JP | 09-319520 A | 12/1997 |
| JP | 2001-075735 A | 3/2001 |
| JP | 2008-096553 A | 4/2008 |
| KR | 10 2007-0026629 A | 3/2007 |
| WO | WO 2005/114639 A2 | 12/2005 |

OTHER PUBLICATIONS

Korean Notice of Allowance in KR 10-2009-0079186, dated Sep. 23, 2011.

* cited by examiner

*Primary Examiner* — Chanh Nguyen
*Assistant Examiner* — Ram Mistry
(74) *Attorney, Agent, or Firm* — Lee & Morse, P.C.

(57) ABSTRACT

A touch panel comprises light sensing circuits configured to generate light sensing data, scan lines, a scan driving unit configured to sequentially apply scan pulses to the light sensing circuits via the scan lines, data lines, a data receiving unit configured to receive the light sensing data transmitted via the data lines in a first/second data receiving state, and generate touch data including first and second touch data, and a location calculation unit configured to determine a touch location using the touch data. In the first/second data receiving state, two neighboring data lines in each first/second combination are electrically coupled to each other, and light sensing data from the data lines in each first/second combination are combined so as to generate a first/second data. The first/second touch data includes the first/second data from each of the first/second combinations. The second combinations are different from the first combinations.

18 Claims, 3 Drawing Sheets

TOUCH PANEL USING A LIGHT SENSING METHOD, METHOD FOR DETECTING A TOUCH LOCATION, AND RECORDING MEDIUM STORING PROGRAM TO EXECUTE THE METHOD

BACKGROUND

1. Field

The embodiments relate to a touch panel using a light sensing method, a method for detecting a touch location, and a recording medium storing a program to execute the method.

2. Description of the Related Art

Touch panels are devices in which a user inputs operation commands by touching a panel directly. Recently, the touch panel has been used for various devices. Various methods such as a resistive method, a capacitive method, and a light sensing method are used for detecting a touch location on a touch panel.

A touch panel using the light sensing method includes light sensing circuits in a display panel. A touch location is calculated by using light sensing data generated by the light sensing circuits. The light sensing data may be values of currents generated by the light sensing circuit. The light sensing circuits are formed in a matrix format on the display panel. The currents generated by the light sensing circuits arranged in rows of the matrix format are sequentially output. The output currents are converted into digital values and stored in a line memory.

FIG. 1A is a schematic diagram illustrating a line memory of a touch panel using a light sensing method in which touch data is generated with a 1:1 method. In the 1:1 method, a touch data is generated from a value of a current generated from a single light sensing circuit. The touch data generated by using light sensing data is represented by digital data. In a touch panel having a plurality of light sensing circuits arranged in a matrix of n×m, each of m light sensing data is generated from a single scan line, and n×m light sensing data are generated during a single cycle. Therefore, n×m touch data are generated.

To this end, when the touch data is generated by using the light sensing data output from the light sensing circuits located in a first row, the touch data generated from the light sensing data output from the light sensing circuits in the first row are stored in a first line memory block. The touch data generated from the light sensing data output from the light sensing circuits in a second row are stored in a second line memory block and so forth. Thus, according to the above method, n×m light sensing data is converted into n×m digital touch data.

However, sensitivities of the light sensing circuits may not be reliable yet. When touch data is generated with the 1:1 method, accurate touch data may not be generated, and therefore, calculation of a touch location may be inaccurate.

FIG. 1B is a schematic diagram illustrating a line memory of a touch panel using the light sensing method in which touch data is generated with a 2:1 method. In the 2:1 method, a touch data is generated by using light sensing data generated by two neighboring light sensing circuits. That is, in a touch panel having a plurality of light sensing circuits arranged in a matrix of n×m, m/2 light sensing data are generated by a single scan line. Accordingly, (n×m)/2 light sensing data are generated during a single cycle, and thus, (n×m)/2 touch data are generated.

To this end, when the touch data is generated by using the light sensing data output from the light sensing circuits located in a first row, the touch data generated by the light sensing data output from the light sensing circuits in the first and second rows are stored in a first line memory block. The touch data generated from the light sensing data output from the light sensing circuits in third and fourth rows are stored in a second line memory block. Thus, according to the above method, the n×m light sensing data are converted into (n×m)/2 digital touch data.

Since more accurate touch data is generated in using the 2:1 method than the 1:1 method, calculation of a touch location may be more accurate. However, since two light sensing data generated by the two light sensing circuits are combined and converted into a touch data, the total number of touch data is reduced. Consequently, the resolution of a touch panel decreases.

SUMMARY

Embodiments are therefore directed to a touch panel using the light sensing method, a method for detecting a touch location, and a recording medium storing a program to execute the method, which substantially overcome one or more of the problems due to the limitations and disadvantages of the related art.

It is therefore a feature of an embodiment to provide a touch panel, comprising: a plurality of light sensing circuits, each light sensing circuits being configured to generate light sensing data according to brightness of incident light; a plurality of scan lines coupled to the plurality of light sensing circuits; a scan driving unit configured to sequentially apply scan pulses to the plurality of light sensing circuits via the plurality of scan lines; a plurality of data lines coupled to the plurality of light sensing circuits; a data receiving unit configured to receive the light sensing data transmitted via the plurality of data lines in a first data receiving state and a second receiving state, and generate touch data including first touch data and second touch data; and a location calculation unit configured to determine a touch location by using the touch data, wherein in the first data receiving state, two neighboring data lines in each of first combinations are electrically coupled to each other, and light sensing data from the data lines in each of the first combinations are combined so as to generate a first data, the first touch data including the first data from each of the first combinations, in the second data receiving state, two neighboring data lines in each of second combinations are electrically coupled to each other and light sensing data from the data lines in each of the second combinations are combined so as to generate a second data, the second touch data including the second data from each of the second combinations, and the second combinations are different from the first combinations.

It is therefore another feature of an embodiment to provide a method for detecting a touch location on a touch panel including a plurality of light sensing circuits, each configured to generate the light sensing data according to brightness of incident light, the method comprising: sequentially applying a plurality of scan pulses to a plurality of scan lines; outputting light sensing data from the light sensing circuits to which the plurality of scan pulses is applied; when in a first data receiving state, electrically coupling two neighboring data lines in each of first combinations, and combining light sensing data transmitted from the data lines in each of the first combinations so as to generate a first data, first touch data including the first data from each of the first combinations; when in the second data receiving state, electrically coupling two neighboring data lines in each of second combinations, and combining light sensing data transmitted from the data lines in each of the second combinations so as to generate a second data, the second touch data including the second data from each of the first combinations; and determining the touch location using the first and second touch data, wherein the first combinations are different from the second combinations.

In the data receiving unit, the first data receiving state and the second data receiving state may be alternately switched per frame. A frequency of the frame may be twice as an operational frequency of the touch panel. A frequency of the frame may be 120 Hz. The The plurality of light sensing circuits may be arranged in an n×m matrix format (n and m being natural numbers, respectively). Each of the scan lines may be coupled to light sensing circuits arranged in each of n rows of the matrix format. Each of the data lines may be coupled to light sensing circuits arranged in each of m columns of the matrix format.

A number of touch data of a frame may be m−1.

When a number of touch data reaches m−1, the data receiving unit may determine that the touch data of a frame is generated, and the location calculation unit may determine a touch location by using the touch data. When the number of touch data does not reach m−1, the scan driving unit may continue to apply the scan pulses to light sensing circuits.

The data receiving unit may include a line memory having m−1 memory blocks.

It is therefore another feature of an embodiment to provide a computer readable recording medium having recorded thereon a program for executing the method as described above.

BRIEF DESCRIPTION OF THE DRAWINGS

The above and other features and advantages will become more apparent by describing in detail exemplary embodiments with reference to the attached drawings in which.

DETAILED DESCRIPTION

Figure 1A:
FIG. 1A illustrates a schematic diagram of a line memory for a touch panel using the light sensing method in which touch data is generated with a 1:1 method.
Figure 1B:
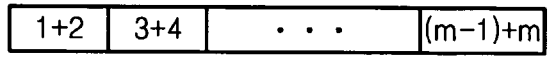
FIG. 1B illustrates a schematic diagram of a line memory for a touch panel using the light sensing method in which touch data is generated with a 2:1 method.

Korean Patent Application No. 10-2009-0079186, filed on Aug. 26, 2009, in the Korean Intellectual Property Office, and entitled: "Touch Panel Using Light Sensing Method, Method For Detecting Touch Location, and Recording Medium Storing Program to Execute the Method," is incorporated by reference herein in its entirety.

Exemplary embodiments will now be described more fully hereinafter with reference to the accompanying drawings; however, they may be embodied in different forms and should not be construed as limited to the embodiments set forth herein. Also, when an element is referred to as being "connected to" or "coupled to" other element, it can be directly connected to or coupled to the other element or be indirectly connected to or coupled to the other element with one or more intervening elements interposed therebetween. Hereinafter, like reference numerals refer to like elements.

Figure 2:
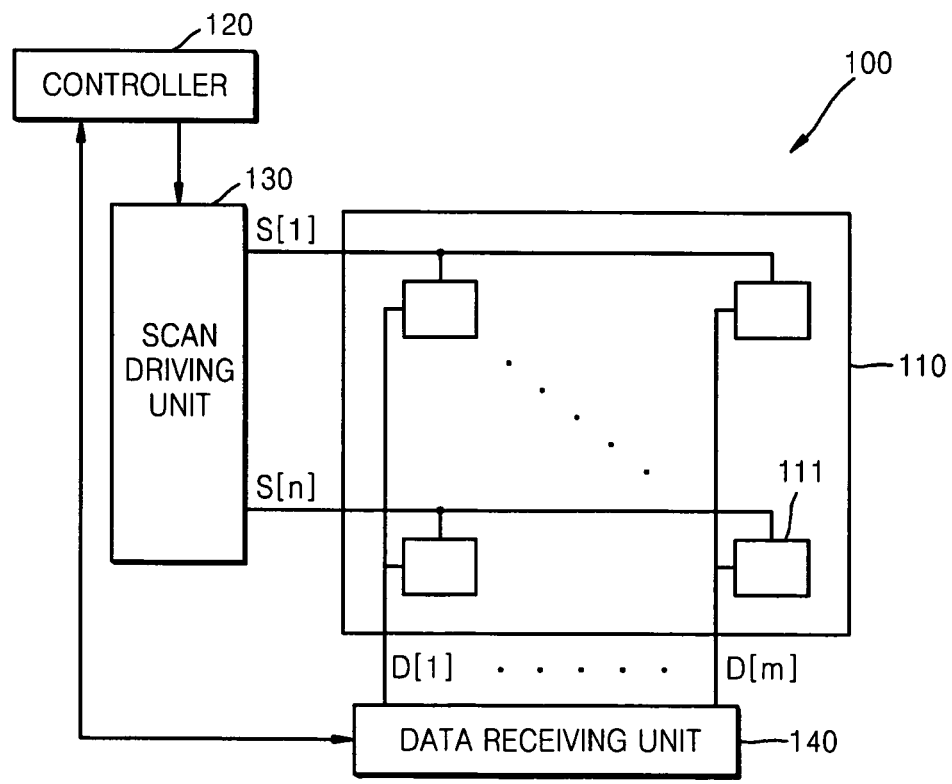
FIG. 2 illustrates a schematic block diagram of a touch panel using a light sensing method according to an exemplary embodiment.

FIG. 2 illustrates a schematic block diagram of a touch panel using the light sensing method according to an exemplary embodiment.

Referring to FIG. 2, a touch panel 100 according to the exemplary embodiment may include a pixel unit 110, a controller 120, a scan driving unit 130, and a data receiving unit 140. Here, the touch panel 100 may adopt a light sensing method. The pixel unit 110 may include a plurality of light sensing circuits 111 that are arranged in an n×m matrix format. Each of the light sensing circuits 111 may sense light input from the outside and generate light sensing data. Each of the light sensing data may be a current value corresponding to brightness of light sensed by each of the light sensing circuits 111. When scan pulses are applied to the light sensing circuits 111, the light sensing circuits 111 may output the generated light sensing data. The light sensing circuits 111 may be implemented with well known light sensing circuits. Therefore, detailed description of the light sensing circuits is omitted herein.

The controller 120 may control operations of the scan driving unit 130 and the data receiving unit 140. The data receiving unit 140 may generate touch data. Also, the controller 120 may receive touch data of a frame, and calculate a location to which a touch input is applied by a user. That is, the controller 120 may include a location calculation unit. Although it is described in the exemplary embodiment that the controller 120 may control the data receiving unit 140 and calculate a touch location, embodiments are not limited to this embodiment. For example, while the controller 120 may control the data receiving unit 140, a location calculation unit configured to determine a touch location using the touch data may be provided separately.

Each of a plurality of scan lines S[1]-S[n] may be connected to light sensing circuits 111 arranged in each of n rows of the matrix format. The scan driving unit 130 may be connected to the plurality of scan lines S[1]-S[n]. The scan driving unit 130 may sequentially apply scan pulses to a first scan line S[1] through an nth scan line S[n]. Each of the scan pulses applied to the scan lines S[1]-S[n] may be transmitted to the light sensing circuits 111 connected to each of the scan lines S[1]-S[n]. The light sensing circuits 111 to which the scan pulses are applied output light sensing data.

The data receiving unit 140 may receive the light sensing data from the light sensing circuits 111, and generate touch data. The data receiving unit 140 may be connected to a plurality of data lines D[1]-D[m]. Each of the plurality of data lines D[1]-D[m] may be connected to light sensing circuits 111 arranged in each of m columns of the matrix format. When a scan pulse is applied to one of the scan lines S[1]-S[n], light sensing data may be output from the light sensing circuits 111 arranged in a row to which the scan pulse is applied. The light sensing data may be transmitted to the data receiving unit 140 via the data lines D[1]-D[m]. For example, when a scan pulse is applied to the first scan line S[1], light sensing data output from light sensing circuits 111 arranged in a first row may be transmitted to the data receiving unit 140.

Figure 3:
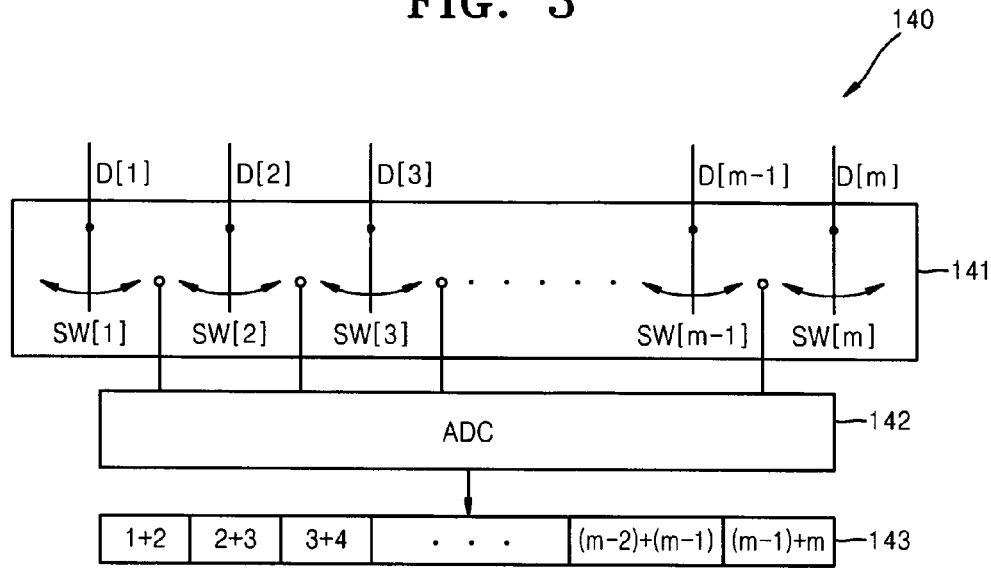
FIG. 3 illustrates a schematic diagram of configuration of a data receiving unit according to an exemplary embodiment.

FIG. 3 is a schematic diagram illustrating configuration of a data receiving unit according to an exemplary embodiment. Referring to FIG. 3, the data receiving unit 140 may include a line combination unit 141, an analog-to-digital converter (ADC) 142, and a line memory 143.

The line combination unit 141 may electrically couple two neighboring data lines, and combine two light sensing data output from the electrically coupled data lines so as to generate a data. The line combination unit 141 may have a first data receiving state and a second data receiving state. Combinations of the data lines to be electrically coupled in the first data receiving state are different from combinations of the data lines to be electrically coupled in the second data receiving state.

The line combination unit 141 may be connected to the data lines D[1]-D[m]. The line combination unit 141 may include a plurality of switching devices SW[1]-SW[m] to electrically couple the data lines D[1]-D[m]. Each of the data lines D[1]-D[m] may be connected to a switching device. For example, a first data line D[1] may be connected to a first switching device SW[1], a second data line D[2] may be connected to a second switching device SW[2], ... and an mth data line D[m] may be connected to an mth switching device SW[m]. The switching devices SW[1]-SW[m] may create different data receiving states by changing the state thereof A method for electrically coupling the data lines D[1]-D[m] will be described with reference to FIGS. 4A and 4B.

Figure 4A:
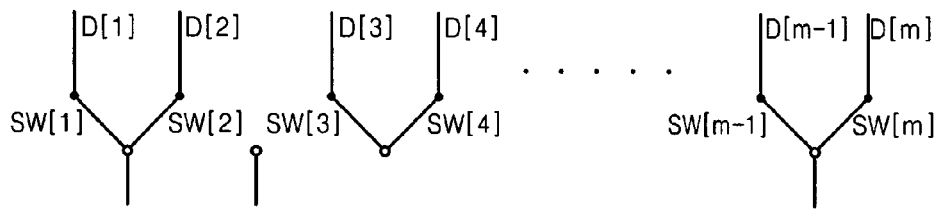
FIGS. 4A and 4B illustrate schematic diagrams of two types of data receiving states of a line combination unit according to an exemplary embodiment.
Figure 4B:
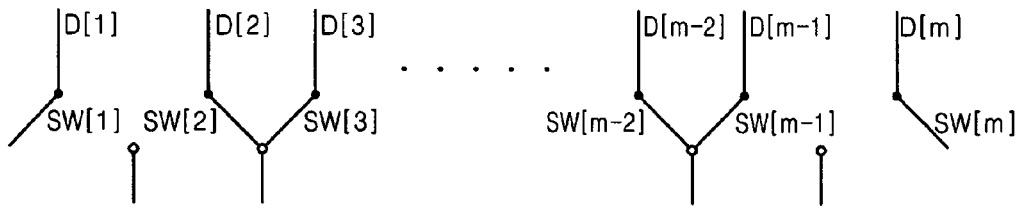

FIGS. 4A and 4B illustrate schematic diagrams of two types of data receiving states of a line combination unit according to an exemplary embodiment. FIG. 4A illustrates the first data receiving state. Referring to FIG. 4A, the switching devices SW[1]-SW[m] included in the line combination unit 141 may electrically couple neighboring data lines according to an external control signal. More specifically, the first data line D[1] and a second data line D[2] may be electrically coupled to each other via the first switching device SW[1] and the second switching device SW[2] to combine two light sensing data transmitted via the first and second data lines D[1] and D[2]. Also, a third data line D[3] and a fourth data line D[4] may be electrically coupled to each other via a third switching device SW[3]and a fourth switching device SW[4] to combine two light sensing data transmitted through the third and fourth data lines D[3] and D[4]. The light sensing data combined in the first data receiving state may be transmitted to the ADC 142.

FIG. 4B illustrates the second data receiving state. Referring to FIG. 4B, the switching devices SW[1]-SW[m] included in the line combination unit 141 may electrically couple neighboring data lines in different combinations according to an external control signal. The combinations in the second data receiving state are different from those in the first data receiving state. That is, the data lines electrically coupled in the first data receiving state are not electrically coupled to each other again. For example, the second data line D[2] and the third data line D[3] may be electrically coupled to each other via the second and third switching devices SW[2] and SW[3] to combine two light sensing data transmitted via the second and third data lines D[1] and D[2]. Also, the fourth data line D[4] and the fifth data line D[5] may be electrically coupled to each other via the fourth and fifth switching devices SW[4] and SW[5] to combine two light sensing data transmitted via the fourth and fifth data lines D[4] and D[5]. The light sensing data combined in the second data receiving state may be transmitted to the ADC 142.

The first data receiving state and the second data receiving data may be alternately switched per frame. For example, while the first data receiving state may be set in odd-numbered frames, the second data receiving state may be set in even-numbered frames. The change of the data receiving states may occur in synchronization with a vertical sync signal applied to a touch panel. That is, the data receiving state may be switched with a start of each scan cycle.

Although in the exemplary embodiment the switching devices SW[1]-SW[m] are used to electrically couple the data lines D[1]-D[m], embodiments are not limited to this one embodiment. The data lines D[1]-D[m] may be electrically coupled in other methods or means.

The ADC 142 may receive the combined light sensing data output from the line combination unit 141. The ADC 142 may convert the received light sensing data represented by analog values into digital values, and generate touch data. The generated touch data may be transmitted to the line memory 143.

The line memory 143 may store the touch data generated by the ADC 142. The touch data may include first touch data generated in the first data receiving state and second touch data generated in the second data receiving state. The first touch data and the second touch data may be stored in memory blocks corresponding thereto. The number of the first touch data may be m/2. The number of the second touch data may be (m/2)−1. The total number of the touch data of a frame may be (m/2)+(m/2)−1, that is, m−1. Thus, the number of memory blocks of the line memory 143 may be m−1.

When all of the first and second touch data are generated, and stored in the memory blocks of the line memory 143, the touch data of a frame, namely, the combined first and second touch data is transmitted to the location calculation unit.

The touch data of a frame may be generated using touch data generated in two scan cycles or two frames, that is, the first touch data and the second touch data. In the touch panel using the light sensing method according to the exemplary embodiment, the frequency of a frame or a scan cycle during which a scan line is scanned may be a higher frequency than that generally used for the display to maintain sensitivity in detecting a touch location on the touch panel. For example, this scan frequency may be twice as a generally used frequency. When the generally used frequency is 60 Hz, the scan frequency may be 120 Hz.

Also, although it is described in the exemplary embodiment that two data lines may be electrically coupled to each other, embodiments are not limited to this embodiment. That is, to increase accuracy in calculation of a touch location, touch data may be generated by combining p light sensing data generated by p neighboring light sensing circuits. However, as the number of combined light sensing data increases, a cycle for scanning the scan lines, that is, a cycle (frequency) of a frame may be shortened (or increased). For example, when p light sensing data generated by p light sensing circuits are combined, the frequency of a frame may be at least 60×p Hz assuming that generally used frequency is 60 Hz.

As described above, the touch data may be generated by combining a plurality of light sensing data in different methods, and the frequency of a frame may be increased according to the number of the combined light sensing data. Accordingly, accuracy in detecting a touch location may be improved while resolution and sensitivity in detecting a touch location may be maintained.

Figure 5:
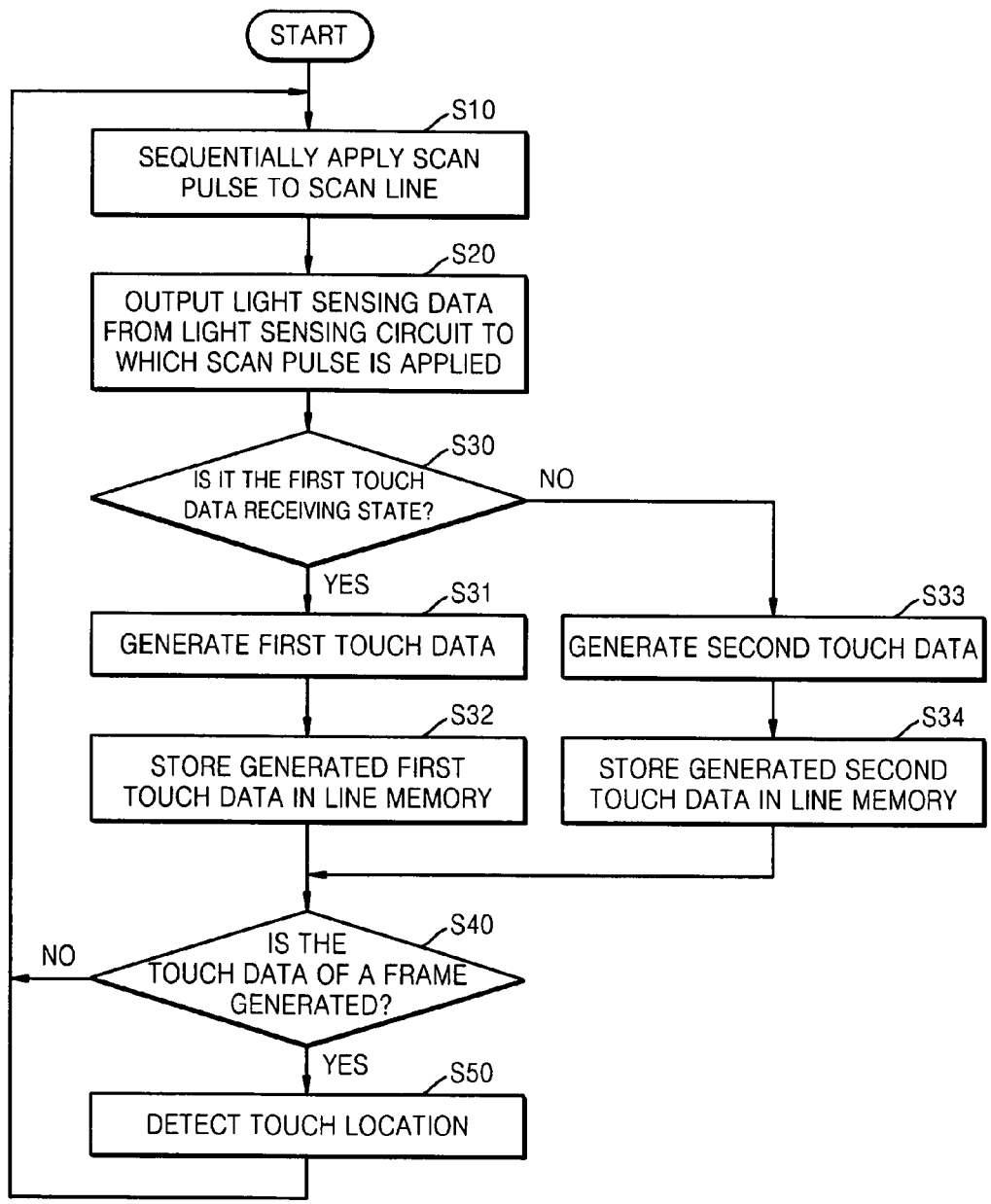
FIG. 5 is a flowchart for explaining a method for detecting a touch location on a touch panel using the light sensing method according to an exemplary embodiment.

FIG. 5 is a flowchart for explaining a method for detecting a touch location on a touch panel using the light sensing method according to an exemplary embodiment. The touch panel using the light sensing method according to the exemplary embodiment may include a plurality of light sensing circuits that are arranged in an n×m matrix format. Each of the plurality of light sensing circuits may generate light sensing data according to brightness of incident light. Also, the touch panel may detect the touch location by using the generated light sensing data.

In the touch panel using the light sensing method according to the exemplary embodiment, scan pulses may be sequentially applied to a plurality of scan lines (S10). The light sensing circuits connected to the scan lines to which the scan pulses are applied may output light sensing data generated by detected light (S20). The light sensing data may be values of currents generated by photodiodes.

When the light sensing data is output, it may be determined whether a current data receiving state is to be the first data receiving state or the second data receiving state (S30). The data receiving states may be alternately switched per scan cycle. That is, per frame, the first data receiving state may be switched to the second data receiving state, or the second data receiving state may be switched to the first data receiving state. In the first data receiving state, two neighboring data lines are electrically coupled, and the two light sensing data from the coupled data lines are combines to generate a first data. Also, in the second data receiving state, two neighboring data lines are electrically coupled, and the light sensing data from the coupled data lines are combined to generate a second data. However, combinations of the data lines in the first data receiving states are different from combinations of the data lines in the second data receiving states.

When a current data receiving state is determined to be the first data receiving state, neighboring data lines in first combinations may be electrically connected to each other, and the output light sensing data may be combined so that the first touch data may be generated (S31). The generated first touch data is stored in the memory blocks of the line memory corresponding thereto (S32).

On the other hand, when a current data receiving state is determined to be the second data receiving state, neighboring data lines in second combinations may be electrically connected to each other, and the output light sensing data may be combined so that the second touch data may be generated (S33). The second combinations are different from the first combinations. The generated second touch data is stored in the memory block of the line memory corresponding thereto (S34).

The touch data of a frame for detecting a touch location may be obtained by combining the generated first and second touch data. That is, the touch data of a frame may be obtained by using the light sensing data in two cycles or two frames.

Thus, when the first touch data and/or the second touch data are stored in the line memory, it may be determined whether or not touch data of a frame is generated (S40). When it is determined that the touch data of a frame is generated, a touch location may be detected using the generated touch data (S50).

When any of the first touch data and the second touch data is not generated yet, it may be determined that the touch data of a frame is not generated. When it is determined that the touch data of a frame is not generated, scanning may further be performed in another cycle so as to generate the touch data that has not been generated.

The number of touch data generated in the first data receiving state may be m/2. The number of touch data generated in the second data receiving state may be (m/2)−1. Thus, the number of touch data of a frame that are finally generated may be m−1.

Touch data of a frame may be generated using touch data that is generated in two scan cycles or two frames. In the method for detection a touch location according to the exemplary embodiment, the frequency of a frame or a scan cycle during which a scan line is scanned may be 120 Hz to maintain sensitivity in detecting a touch location. This frequency is twice as the generally used the frequency, or 60 Hz.

Also, although it is described in the exemplary embodiment that two data lines may be coupled to each other, embodiments are not limited to this embodiment. That is, the touch data may be generated by electrically coupling p data lines. In this case, the frequency of a frame may be 60×p Hz.

As described above, the touch data may be generated by combining a plurality of light sensing data in different manners and the frequency of a frame may be increased according to the number of the combined light sensing data. Accordingly, accuracy in detecting a touch location may be improved while resolution and sensitivity in detecting a touch location may be maintained.

The method for detecting a touch location according to the embodiments may also be embodied as computer readable codes on a computer readable recording medium. The computer readable recording medium may be any data storage device that can store data which can be thereafter read by a computer system. Examples of the computer readable recording medium may include a read-only memory (ROM), a random-access memory (RAM), a CD-ROM, a magnetic tape, a floppy disk, an optical data storage device, etc. The computer readable recording medium may also be distributed over a network coupled to computer systems so that the computer readable code stored and executed in a distributed fashion.

What is claimed is:
1. A touch panel, comprising:
a plurality of light sensing circuits, each light sensing circuits being configured to generate light sensing data according to brightness of incident light;
a plurality of scan lines coupled to the plurality of light sensing circuits;
a scan driving unit configured to sequentially apply scan pulses to the plurality of light sensing circuits via the plurality of scan lines;
a plurality of data lines coupled to the plurality of light sensing circuits;
a data receiving unit configured to receive the light sensing data transmitted via the plurality of data lines in a first data receiving state and a second receiving state, and generate touch data including first touch data and second touch data; and
a location calculation unit configured to determine a touch location by using the touch data, wherein
in the first data receiving state, two directly neighboring data lines in each of first combinations of data lines are electrically coupled to each other, and light sensing data from the data lines in each of the first combinations are combined so as to generate a first data, the first touch data including the first data from each of the first combinations,
in the second data receiving state, two directly neighboring data lines in each of second combinations of data lines are electrically coupled to each other and light sensing data from the data lines in each of the second combinations are combined so as to generate a second data, the second touch data including the second data from each of the second combinations, and
the second combinations are different from the first combinations,
wherein only the first and second data receiving states are alternately switched per frame, every two directly neighboring data lines being electrically coupled via a switch to provide m/2 or (m/2)−1 data, where m is a number of data lines.

2. The touch panel as claimed in claim 1, wherein in the data receiving unit, the first data receiving state and the second data receiving state are alternately switched per frame.

3. The touch panel as claimed in claim 2, wherein a frequency of the frame is at least twice an operational frequency of the touch panel.

4. The touch panel as claimed in claim 3, wherein a frequency of the frame is 120 Hz.

5. The touch panel of claim 2, wherein the location calculation unit uses a combination of the first touch data generated in the first data receiving state and the second touch data generated in the second data receiving state as touch data of the frame.

6. The touch panel as claimed in claim 1, wherein the plurality of light sensing circuits are arranged in an n×m matrix format (n and m being natural numbers, respectively).

7. The touch panel as claimed in claim 6, wherein in the data receiving unit, the first data receiving state and the second data receiving state are alternately switched per frame, and a number of touch data of a frame is m−1.

8. The touch panel as claimed as claim 7, wherein
when a number of touch data reaches m−1, the data receiving unit determines that the touch data of a frame is generated, and the location calculation unit determines a touch location by using the touch data, and
when the number of touch data does not reach m−1, the scan driving unit continues to apply the scan pulses to light sensing circuits.

9. The touch panel as claimed in claim 6, wherein the data receiving unit includes a line memory having m−1 memory blocks.

10. The touch panel as claimed in claim 1, wherein the data receiving unit is configured to receive the light sensing data from all of the plurality of data lines in one of the first and second data receiving states and to receive the light sensing data from all of the plurality of data lines except first and last data lines in the other of the first and second data receiving states.

11. A method for detecting a touch location on a touch panel including a plurality of light sensing circuits, each configured to generate the light sensing data according to brightness of incident light, the method comprising:
sequentially applying a plurality of scan pulses to a plurality of scan lines;
outputting light sensing data from the light sensing circuits to which the plurality of scan pulses is applied;
when in a first data receiving state, electrically coupling two directly neighboring data lines in each of first combinations of data lines, and combining light sensing data transmitted from the data lines in each of the first combinations so as to generate a first data, the first touch data including the first data from each of the first combinations;
when in a second data receiving state, electrically coupling two directly neighboring data lines in each of second combinations of data lines, and combining light sensing data transmitted from the data lines in each of the second combinations so as to generate a second data, the second touch data including the second data from each of the first combinations, wherein the first combinations are different from the second combinations; and
determining a touch location using the first touch data and the second touch data,
wherein only the first and second data receiving states are alternately switched per frame, every two directly neighboring data lines being electrically coupled via a switch to provide m/2 or (m/2)−1 data, where m is a number of data lines.

12. The method as claimed in claim 11, wherein a frequency of the frame is at least twice an operational frequency of the touch panel.

13. The method as claimed in claim 12, wherein the frequency of the frame is 120 Hz.

14. The method as claimed in claim 11, wherein determining the touch location includes combining the first touch data and the second touch data as touch data of the frame.

15. The method as claimed in claim 11, wherein the plurality of light sensing circuits are arranged in an n−m matrix format.

16. The method as claimed in claim 15, wherein in the data receiving unit, the first data receiving state and the second data receiving state are alternately switched per frame, and a number of touch data of a frame is m−1.

17. The method as claimed in claim 16, further comprising:
when the number of touch data reaches m−1, determining that the touch data of a frame is generated, and determining a touch location by using the touch data; and
when the number of touch data does not reach m−1, continuing to apply the scan pulses to light sensing circuits.

18. A non-transitory computer readable recording medium having recorded thereon a program for executing the method as claimed in claim 11.

* * * * *